No. 831,612. PATENTED SEPT. 25, 1906.
W. P. HUSSEY.
PIPING SYSTEM FOR HEATERS.
APPLICATION FILED JULY 31, 1905.
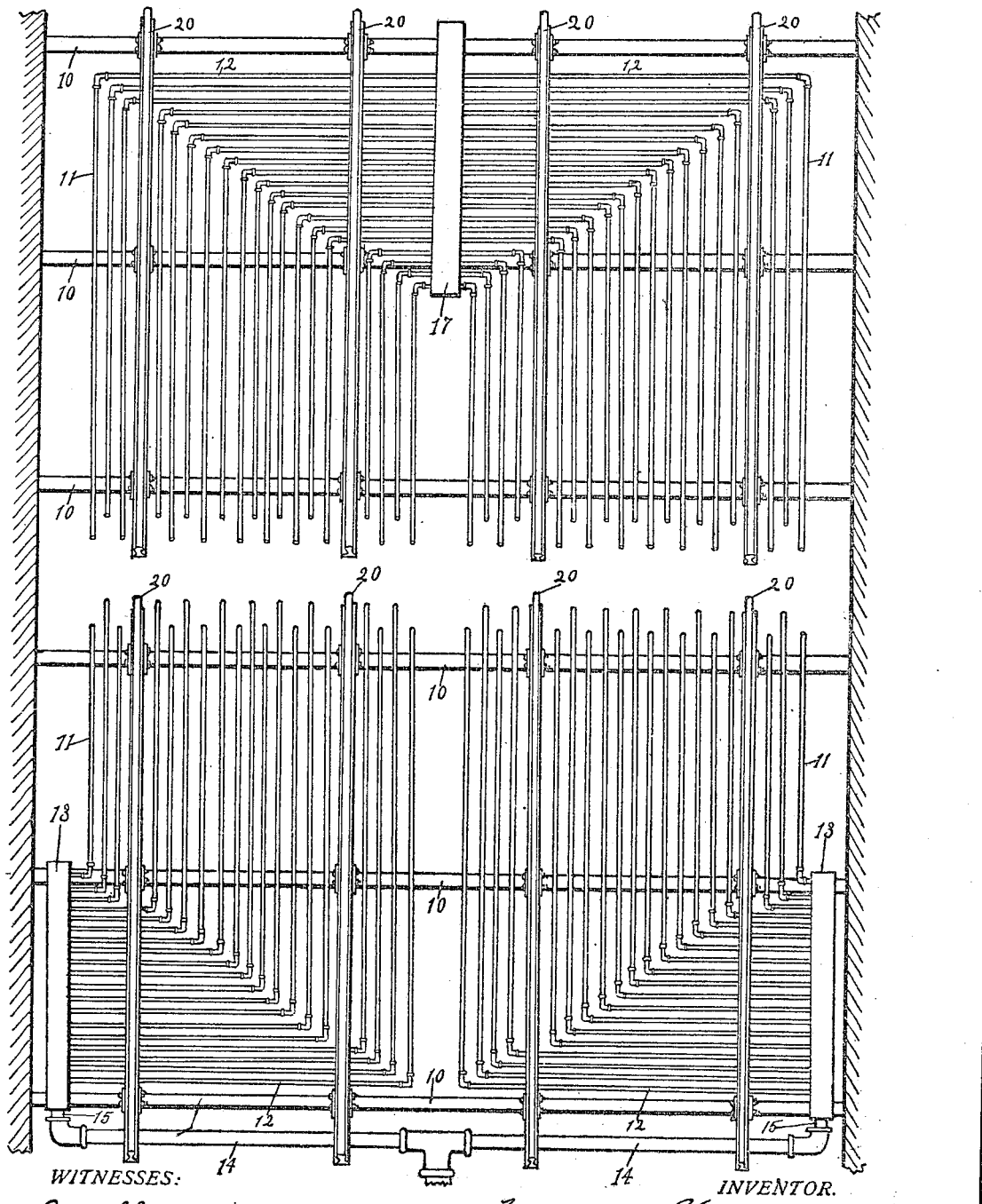
WITNESSES:
N. Allemong
Carrie Mixm.
INVENTOR.
Wm P. Hussey
BY
V. H. Lockwood
ATTORNEY.

UNITED STATES PATENT OFFICE.

WILLIAM P. HUSSEY, OF INDIANAPOLIS, INDIANA, ASSIGNOR TO STANDARD DRY KILN COMPANY, OF INDIANAPOLIS, INDIANA, A CORPORATION OF INDIANA.

PIPING SYSTEM FOR HEATERS.

No. 831,612.  Specification of Letters Patent.  Patented Sept. 25, 1906.

Application filed July 31, 1905. Serial No. 272,053.

*To all whom it may concern:*

Be it known that I, WILLIAM P. HUSSEY, of Indianapolis, county of Marion, and State of Indiana, have invented a certain new and useful Piping System for Heaters; and I do hereby declare that the following is a full, clear, and exact description thereof, reference being had to the accompanying drawing, in which like figures refer to like parts.

The object of this invention is to improve the piping systems for dry-kilns and similar constructions for drying lumber or other material. One feature consists in arranging a system so that the main bodies of all heating-pipes will be of uniform length and the transversely-extending pipes at each end of the longitudinal pipes will complement each other and together be of uniform length throughout the system. This system also provides fully for expansion and contraction and has substantially two halves drained by one drain-header and each half supplied by an independent supply-header.

The general nature of the invention will be understood from the accompanying drawing and the following description and claims.

The drawing shows a plan view of the system of pipes for a lumber dry-kiln.

In detail suitable transverse pipe-supporting beams 10 are secured at their ends in the walls and they carry the longitudinal portions of the heating-pipes 11, all of which are of the same length. Each longitudinal portion of pipe has at each end a transversely-extending pipe 12. The longitudinal pipes are arranged in two series or halves, half on each side of the central part of the kiln.

A supply-header 13 is connected with the longitudinally-extending end pipes 12 of each side or half of the system. The two supply-headers are therefore parallel with the longitudinal pipes 11 and are supplied with steam through the pipe 14 and the intermediate short connecting-pipes 15. The supply-headers therefore are remote from each other and the end pipes 12, leading from them, extend inwardly from the headers to the longitudinally-extending heating-pipes 11.

At the other end of the system there is only one drain-header 17, centrally located, but extending longitudinally and being connected with the end pipes 12, which extend inwardly from the ends of the longitudinal pipes to the drain-header.

The end pipes 12, secured to the two ends of the longitudinal pipes 11, are, when taken together, of the same aggregate length throughout the system. While at one end of the system the end pipes gradually increase in length from the middle outward, at the other end the end pipes correspondingly diminish in length, so that these end pipes complement each other, and they may be all made from pipes of the same length by cutting each pipe once and threading the ends. Aside from the convenience in preparing the pipes for this piping system it is very convenient to build up the system in the kiln or drier, as the pipes have the uniform length referred to and are parallel with each other. Because of this uniformity of length the expansion and contraction are such that the stresses produced therein are uniformly distributed among the unions.

All headers are longitudinally extending and the supply-headers are of double the capacity of the drain-header, and the drain-header is at the middle, while the supply-headers are at the sides, so that there is ample opportunity for the expansion of the longitudinal pipes, which constitutes one of the chief advantages arising from this system. Since the end pipes are together of the same length and the longitudinal pipes also of the same length, the expansion and contraction of the system will always be such that the stresses produced therein are uniformly distributed among the unions and the same effect will be produced at every union of the pipes and headers. 20 represents the track-rails for two railway-tracks over said pipes.

It will be observed from the drawing that it is convenient to provide a gap in the piping system for supports for railway-rails or for any other purpose by omitting one set of pipes.

What I claim as my invention, and desire to secure by Letters Patent, is—

1. In a heating system, a series of heating-pipes arranged parallel with each other, and each consisting of a longitudinally-extending portion, and transverse end portions connected therewith and extending in opposite parallel directions, said longitudinal portions being of the same length and the sum of the lengths of the end portions connected with every longitudinal portion being equal to the sum of the lengths of the end portions connected with every other longitudinal portion, and a header connected with the end portions at each end of the series said headers extending in parallel lines.

2. In a heating system, two series of heating-pipes with the pipes of each series parallel with each other, each pipe consisting of a longitudinally-extending portion, and transverse end portions connected therewith and extending in opposite parallel directions, said longitudinal portions of the pipes being of the same length and the sum of the lengths of the end portions connected with every longitudinal portion being equal to the sum of the lengths of the end portions connected with every other longitudinal portion, the longitudinal portions of both series of heating-pipes being parallel and the inlet end portions extending in opposite directions, a header for the inlet end portions of each series of pipes, and a single drain-header for the outlet end portions of both series of pipes said headers extending parallel with the longitudinal portions of the pipes.

3. In a heating system, a longitudinally-extending drain-header centrally located at one end, two longitudinally-extending supply-headers at the other end, one at each side, a set of pipes leading from the supply-headers to the drain-header, said pipes each consisting of a longitudinal portion with a pipe leading outwardly from the end thereof to the supply-header, and a pipe leading from the other end thereof inwardly to the drain-header, the longitudinal portions of all of said pipes being of the same length and the sum of the lengths of the end portions connected with every longitudinal portion being the same.

In witness whereof I have hereunto affixed my signature in the presence of the witnesses herein named.

WILLIAM P. HUSSEY.

Witnesses:
  CARRIE FLINN,
  N. ALLEMONG.